United States Patent
Sivacoe

(10) Patent No.: US 9,296,025 B2
(45) Date of Patent: Mar. 29, 2016

(54) PIG PUMPING UNIT

(76) Inventor: Orlande Sivacoe, Red Deer (CA)

( * ) Notice: Subject to any disclaimer, the term of this patent is extended or adjusted under 35 U.S.C. 154(b) by 133 days.

(21) Appl. No.: 12/131,874

(22) Filed: Jun. 2, 2008

(65) Prior Publication Data

US 2008/0302389 A1 Dec. 11, 2008

Related U.S. Application Data

(60) Provisional application No. 60/942,347, filed on Jun. 6, 2007.

(30) Foreign Application Priority Data

Jun. 6, 2007 (CA) ..................................... 2590980

(51) Int. Cl.
*B08B 9/032* (2006.01)
*B08B 9/027* (2006.01)
*B08B 9/04* (2006.01)
*B08B 9/043* (2006.01)
*B08B 9/055* (2006.01)

(52) U.S. Cl.
CPC ................. *B08B 9/055* (2013.01); *B08B 9/027* (2013.01); *B08B 9/0322* (2013.01); *B08B 9/0323* (2013.01); *B08B 9/04* (2013.01); *B08B 9/0436* (2013.01); *B08B 9/0551* (2013.01); *Y10T 137/0424* (2013.01); *Y10T 137/86163* (2015.04)

(58) Field of Classification Search
CPC ........ B08B 9/00; B08B 9/027; B08B 9/0322; B08B 9/0323; B08B 9/04; B08B 9/0436; F16L 45/00; F16L 55/00
USPC ........ 15/3.5, 104.061, 104.062; 134/8, 22.11, 134/22.12
See application file for complete search history.

(56) References Cited

U.S. PATENT DOCUMENTS

| | | | | |
|---|---|---|---|---|
| 3,212,116 A | * | 10/1965 | Gentry, Jr. | ........................ 15/3.5 |
| 3,883,431 A | * | 5/1975 | Ishii et al. | ..................... 210/134 |
| 4,203,712 A | * | 5/1980 | Uehara | ......................... 417/218 |
| 5,150,493 A | | 9/1992 | Sivacoe | |
| 5,195,479 A | | 3/1993 | Hasetoh | |
| 5,265,302 A | | 11/1993 | Sivacoe | |
| 5,318,074 A | | 6/1994 | Sivacoe | |
| 5,358,573 A | * | 10/1994 | Sivacoe | .............................. 134/8 |
| 5,379,475 A | | 1/1995 | Sivacoe | |
| 5,685,041 A | | 11/1997 | Sivacoe | |
| 5,927,901 A | * | 7/1999 | Graves | .......................... 405/158 |
| 6,170,493 B1 | | 1/2001 | Sivacoe | |
| 6,289,878 B1 | | 9/2001 | Blass | |
| 6,359,645 B1 | | 3/2002 | Sivacoe | |
| 6,367,572 B1 | * | 4/2002 | Maletschek et al. | .......... 180/305 |
| 6,391,121 B1 | | 5/2002 | Sivacoe | |
| 6,569,255 B2 | | 5/2003 | Sivacoe | |

* cited by examiner

*Primary Examiner* — Saeed T Chaudhry
(74) *Attorney, Agent, or Firm* — Christensen O'Connor Johnson Kindness PLLC

(57) ABSTRACT

A pumping unit is provided that allows at least four passes to be made simultaneously with a single pumping unit. A single engine is used to drive two pumps, each connected into separate pumping circuits. Fluid flow in each of the pumping circuits is controlled by respective flow control elements on the pumping circuits, as for example a variable flow valve. Two engines may thus be used to drive four pumps.

9 Claims, 4 Drawing Sheets

PIG PUMPING UNIT

BACKGROUND

Oil refineries frequency include many kilometers of pipes that require cleaning, as for example in fired heaters, where oil is heated during the refining process. One well established cleaning technique is to run a pig through the pipes under hydraulic pressure to clean the pipes. Pigs are typically polyurethane or strangulated foam cylinders or balls that are studded with scraping elements. The inventor has been a pioneer in the art of pigging, and has obtained U.S. Pat. No. 6,569,255 for a Pig and method for cleaning tubes, U.S. Pat. No. 6,391,121 for a Pig and method for cleaning tubes, U.S. Pat. No. 6,359,645 for a Pipe inspection device and method, U.S. Pat. No. 6,170,493 for a Method of cleaning a heater, U.S. Pat. No. 5,685,041 for a Pipe pig with abrasive exterior, U.S. Pat. No. 5,379,475 for a Scraper for a Pipe Pig, U.S. Pat. No. 5,358,573 for a Method of cleaning a pipe with a cylindrical pipe pig having pins in the central portion, U.S. Pat. No. 5,318,074 for a Plug for a furnace header, U.S. Pat. No. 5,265,302 for a Pipeline Pig, and U.S. Pat. No. 5,150,493 for a Pipeline Pig.

It is standard in the art of pigging for a pumping unit to include a pair of engines each driving a separate pump that is connected into a pumping circuit. Each of the pipes being pigged is connected as part of one of the pumping circuits. Flow control for the pumping circuits is provided by respective throttles on each of the engines. The engines, pumps, operator cabin, and clean and dirty water tanks are all located together on a single trailer. Such a standard pumping unit therefore can control two passes at a time, and thus clean two different pipes at a time. Operation of the pumping unit requires an operator for each engine (two people) plus a person to handle the pigs, total of three workers. In order to clean four pipes at a time, a separate pumping unit is required, and six workers. The separate pumping unit occupies scarce real estate in the refinery.

SUMMARY

A pumping unit is provided that allows at least four passes to be made simultaneously with a single pumping unit. A single engine is used to drive two pumps, each connected into separate pumping circuits. Fluid flow in each of the pumping circuits is controlled by respective flow control elements on the pumping circuits, as for example a variable flow valve. Two engines may thus be used to drive four pumps. These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

A pig pumping unit is usually carried on the trailer of a tractor-trailer unit. In a conventional pumping unit, the engine compartment is typically located over the wheels of the trailer with a fuel tank and operator cabin at the other end, and clean and dirty water tanks in between.

Figure 1:
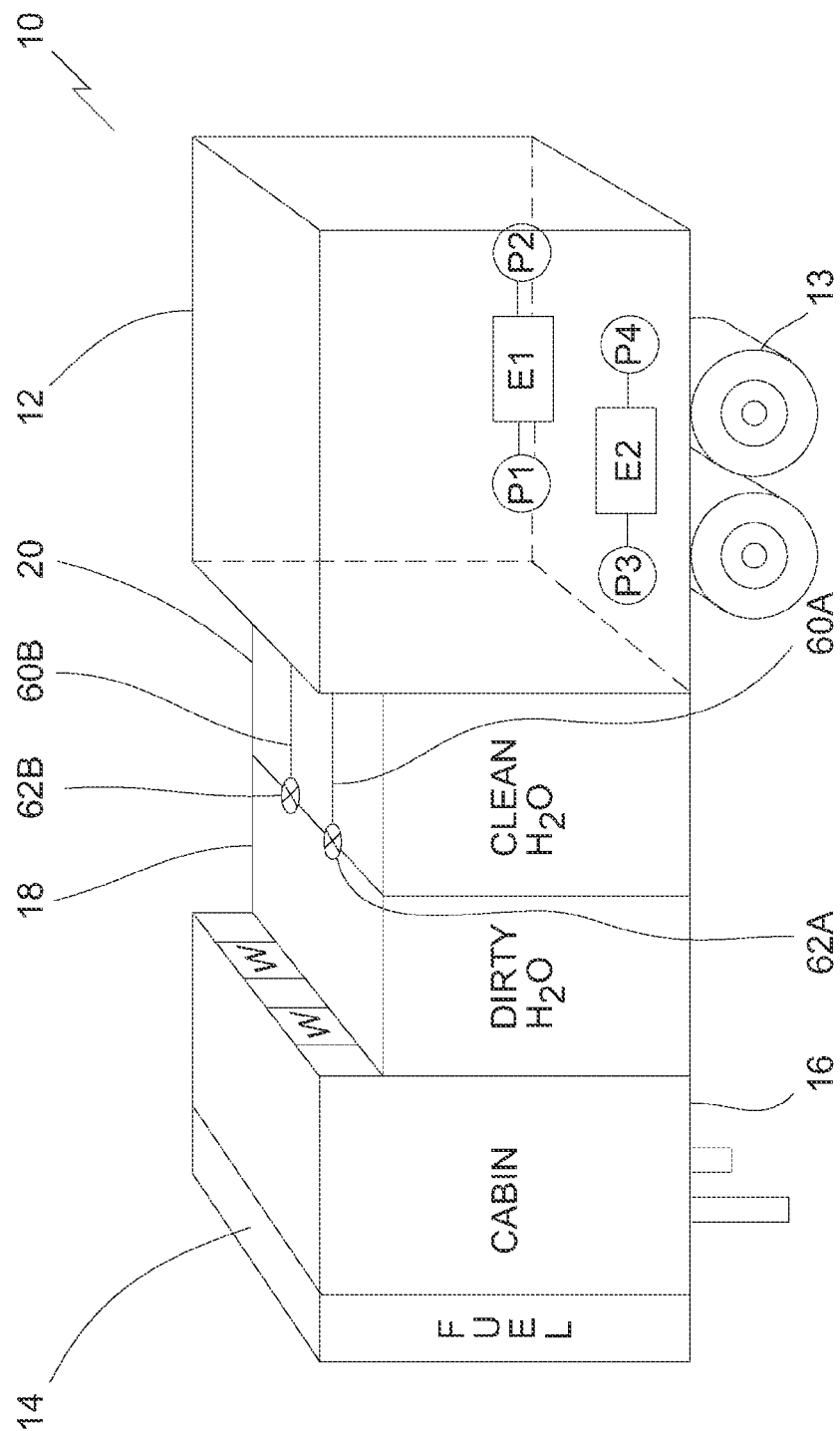
FIG. 1 is a top schematic view of a four pass pumping unit with two engines.

As shown in FIG. 1, in an embodiment of a pumping unit 10, an engine and pump compartment 12 is located over the wheels 13 of a trailer, with a fuel tank 14 at the opposite end of the pumping unit 10. Also at the opposite end of the pumping unit 10 is the operator's cabin 16, with a dirty water tank 18 and clean water tank 20 lying between the operator's cabin 16 and the engine compartment 12. The tanks 18, 20 are lower in height than the operator's cabin 16 and are easily visible from windows W in the operator's cabin. The tanks 18, 20 may be made of several interconnected tanks and need not be a single unit. In the pumping unit 10, the engine and pump compartment 12 houses two engines E1 and E2, engine E1 being connected to drive pumps P1 and P2, and engine E2 being connected to drive pumps P3 and P4. Water from the clean water tank 20 may be supplied into a water bank from which clean water is pumped by the pumps P1-P4 for use as a pig drive fluid.

The engines E1, E2 may be any suitable engine, such as a diesel engine used for powering heavy duty machinery, an example being a Caterpillar C15™ engine, and the pumps P1-P4 may be any pump suitable for use in a pig pumping unit. The individual pump-engine-pump units as illustrated in FIG. 1 may be skid mounted within the engine and pump compartment 12.

Figure 2:
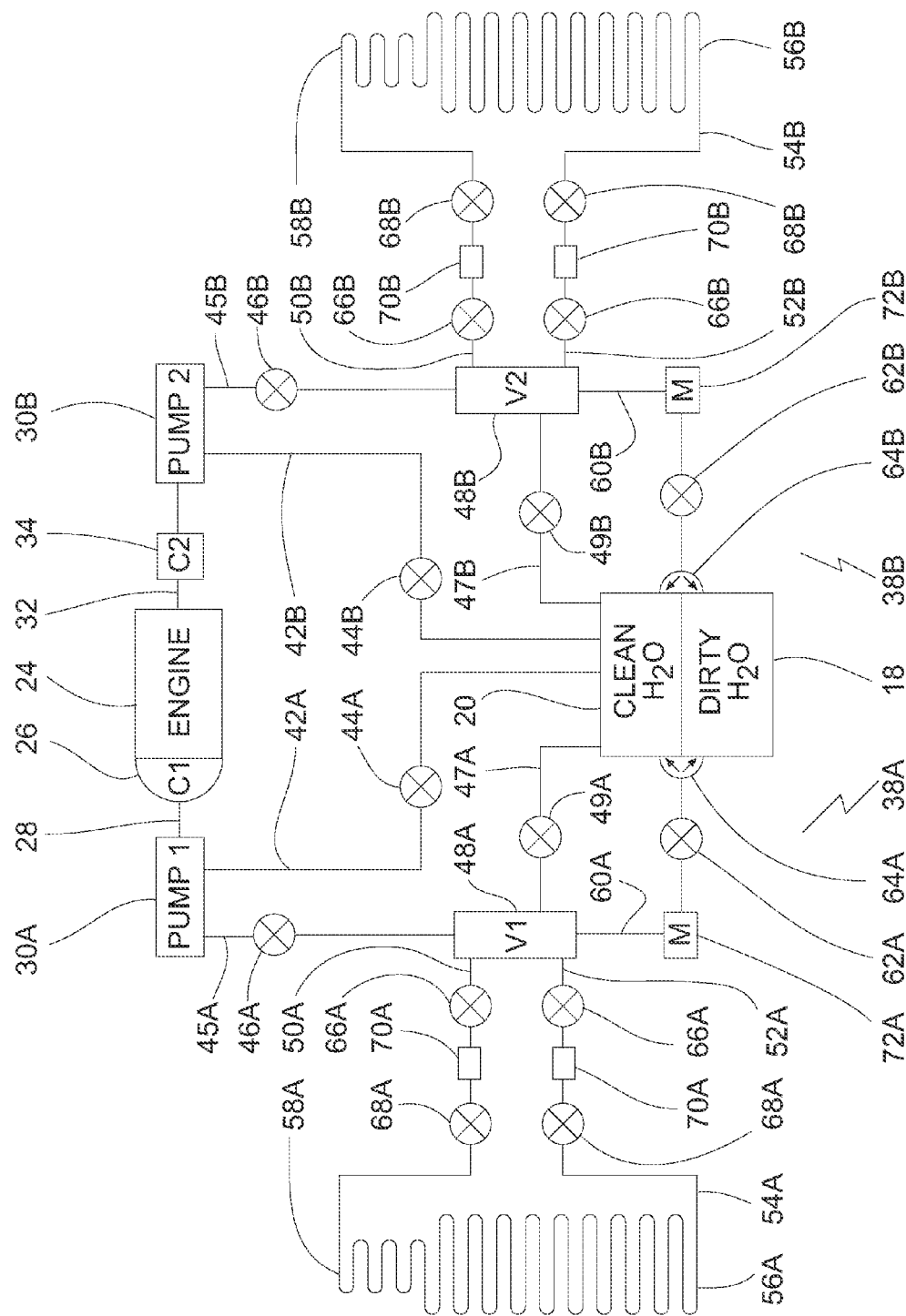
FIG. 2 is a schematic showing details of an engine driving two pumps, each pump being connected into respective pumping circuits.

Referring to FIG. 2, an engine and pump configuration is shown that may be used as the pump-engine-pump configuration P1-E1-P2 or the pump-engine-pump configuration P3-E2-P4. In FIG. 2, engine 24 has an integral clutch 26 from which extends a drive shaft 28. The drive shaft 28 is connected to drive pump 30A (P1). The engine 24 is shown with only one integral clutch, but has a main shaft 32 that extends from the end of the engine 24 opposite to the clutch 26. Main shaft 32 is connected through a stand alone clutch 34 to drive pump 30B (P2). Other clutch and drive shaft configurations may be used to configure a single engine to drive two pumps. In this way, for example, engine 24 may be connected to drive two pumps. Each pump P1-P4 is connected into a valved pumping circuit. An exemplary configuration of two such valved pumping circuits 38A, 38B associated with engine 24 is shown in FIG. 2. The valved pumping circuits 38A and 38B may be constructed in the same way, and thus in the detailed description that follows, only valved pumping circuit 38A is described, the description for valved pumping circuit 38B being the same, except replacing the suffix A with the suffix B in the reference characters.

Pump 30A has an inlet conduit 42A with valve 44A that extends into the clean water tank 20 to provide a supply of clean water to pump 30A. In practice, pump 30A may have one or more such inlets, with different sizes, for example 4 inch or 12 inch inlets. The inlet conduit 42A may be made of a suitable combination of rigid pipe and flexible hoses. Pump 30A has a power outlet conduit 45A with valve 46A that leads to a valve bank 48A. Valve bank 48A has suitable connections 50A, 52A for connecting to either end of a pipe 54A to be cleaned. The pipe 54A may be a pipe in a fired heater. In a fired heater, the pipe typically passes through a radiant heating section 56A (denoted red side) and a convection heating section 58A (denoted blue side). The valve bank 48A itself is conventional and typically comprises four valves for routing fluid either direction through the pipe 54A, and operates together with a bypass valve 49A on bypass line 47A for returning fluid directly back to the clean water tank 20. The bypass line 47A is used for example when using the valve bank 48A to switch between flow directions in the pipe 54A. The valve bank 48A has a return conduit 60A for routing water back to either the dirty water tank 18 or clean water tank 20 through valve 62A and diverter valve 64A. Diverter valve 64A operates to discharge water that has passed through the pipe 54A into either the dirty water tank 18 or clean water tank 20. The return conduit 60A may be any suitable combination of piping and hoses.

The connections 50A, 52A are each provided with valves 66A, 68A and a pig launcher/receiver 70A. The pig launcher/receivers 70A may be placed in parallel or in series with the connections 52A, 54A, and various configurations of pig launcher/receiver may be used.

The valved pumping circuit 38A is provided with a variable flow control element. The variable flow control element regulates flow in the valved pumping circuit 38A and may for example be incorporated into the valved pumping circuit 38A in various ways, such as into the pump 30A, or as a stand alone valve or valves in the valved pumping circuit 38A. In one embodiment, the valve 62A may be a variable flow control valve and may be placed anywhere on the valved pumping circuit 38A between the pump 30A and dirty/clean water tanks 18, 20. More than one variable flow valve may be used for the valve 62A. In one embodiment, the valve 62A may be located at the dirty/clean water tanks 18, 20 on the return conduit 60A and may be supported by the tanks 18, 20 as illustrated in FIG. 1. The return conduit 60A may be provided with a flow meter 72A.

Figure 3:
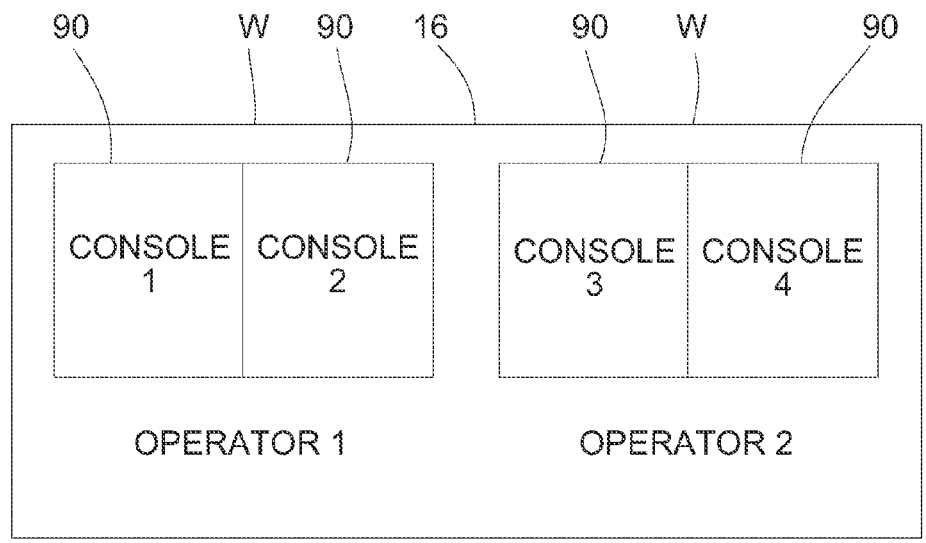
FIG. 3 is a schematic showing an operator's cabin for the pumping unit of FIG. 1 with four consoles.
Figure 4:
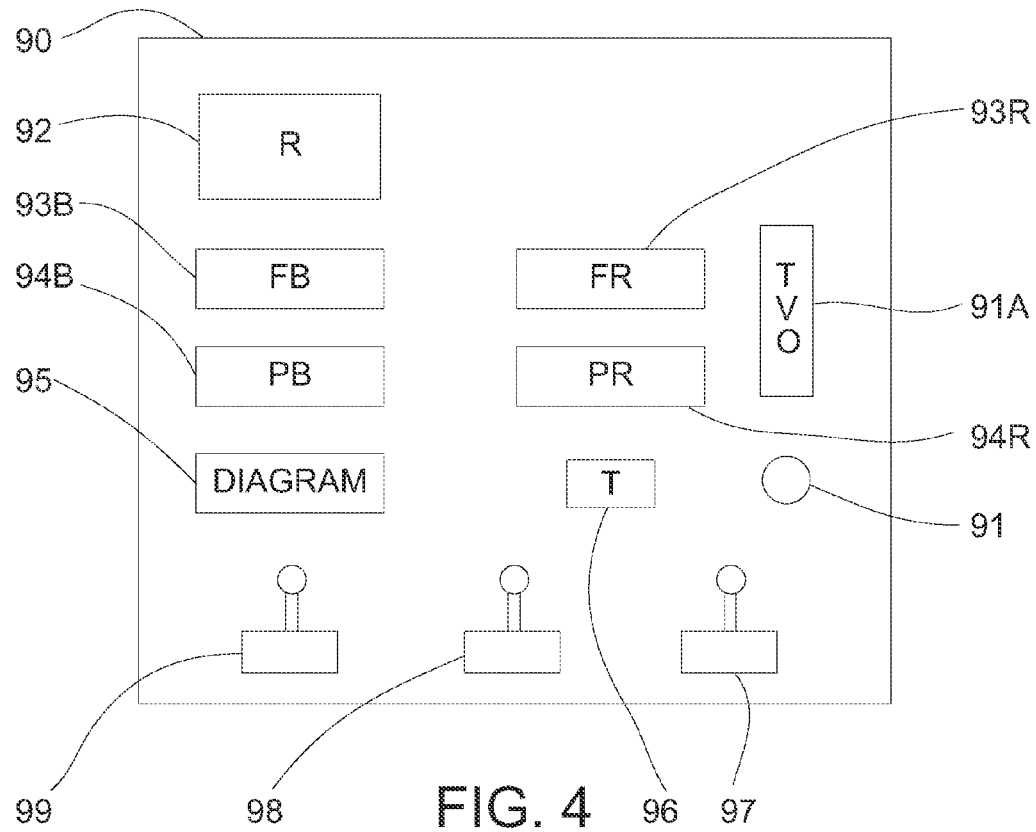
FIG. 4 is a schematic showing a console that may be used in the operator's cabin of FIG. 3.

In the operator's cabin 16, each operator is provided with two consoles 90 as illustrated in FIG. 3. The consoles 90 are arranged so that when the operator is at the console, the dirty/clean water tanks 18, 20 are visible through windows W in the operator cabin 16, or the operators may be provided with other information on the state of the water entering the tanks 18, 20 such as from video cameras directed towards the tanks 18, 20. Each console 90 has the same configuration shown in FIG. 4. In FIG. 4, each console 90 is equipped as follows, with the description being given for pumping circuit 38A for pump P1, and being applicable to the pumping circuits associated with each of pumps P1-P4. Flow in the pumping circuit controlled by the console 90 is controlled by use of throttle control 91, which controls the amount of opening of the variable flow control element, such as valve 60A. The degree of opening of the variable flow control element may be illustrated graphically with gauge 91A. At the top of the console 90 is a flow recorder 92 that indicates the amount of flow passing through flow meter 72A, and flow indicators 93R and 93B that indicate flow through respectively the red and blue sections of the pipe being cleaned. Just below the flow indicators 93R and 93B are two pressure indicators 94R and 94B that indicate pressure in the respective red and blue sections of the pipe being cleaned. A valve position diagram 95 is provided to indicate valve positions for the various flow directions in the pipe 54A and for flow bypass, so that flow returns directly to the tanks 18/20. A timer 96 is also provided. A valve controller 97 that controls the valve bank 48A determines flow direction through the pipe 54A, which may be through red section first, blue section first, or neutral (no flow). The no flow position permits bypass. Valve controller 98 controllers diverter valve 64A, and determines whether fluid is returned to the dirty water tank 18 or the clean water tank 20. Valve controller 99 controls the bypass valve 49A at the valve bank 48A.

Figure 5:
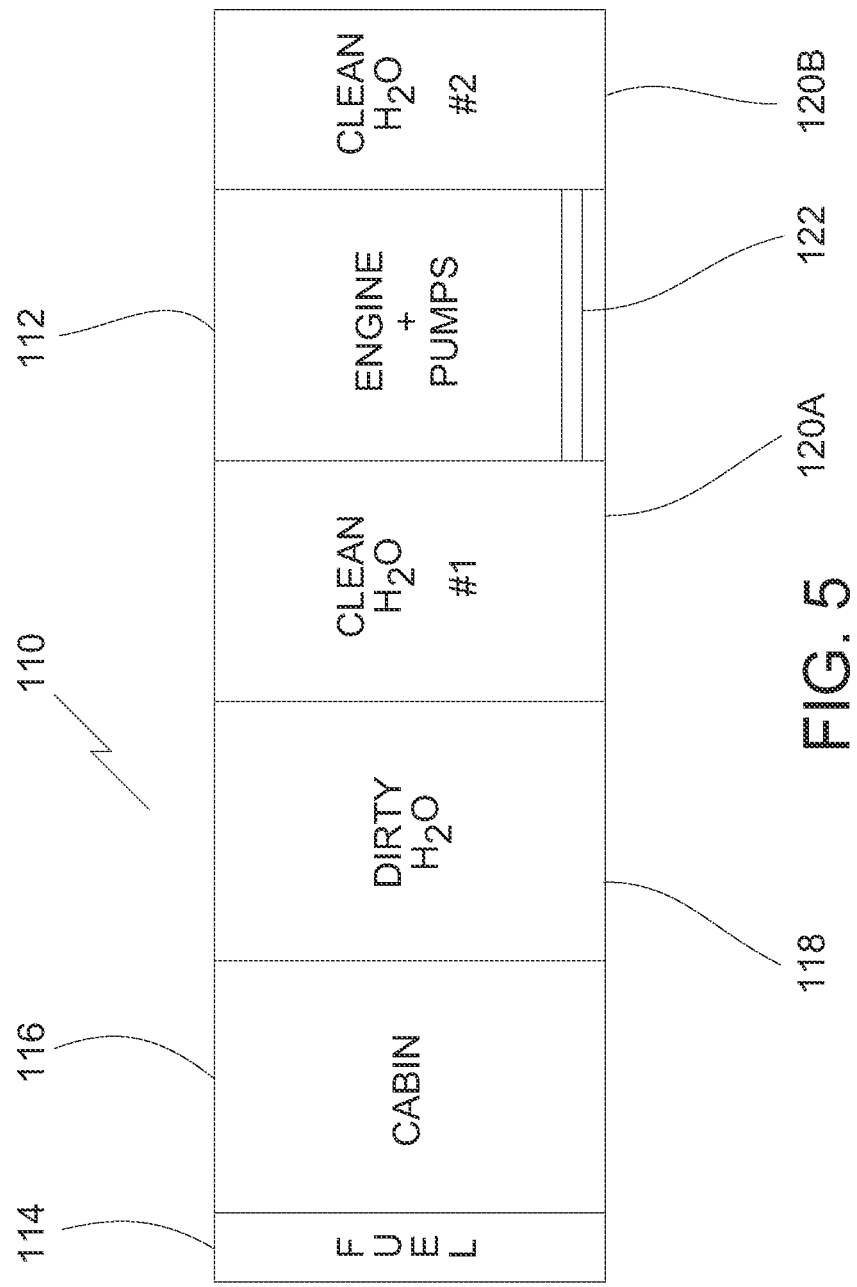
FIG. 5 is a top schematic view of a further four pass pumping unit.

Referring to FIG. 5, a configuration of pumping unit 110 is shown that incorporates an engine compartment 112 (with engine and pump configuration as for example described in relation to the engine and pump compartment 12), fuel tank 114 and operator's cabin 116 (as for example described in relation to FIGS. 3 and 4). In this embodiment, a single dirty water tank 118 is provided, but the clean water tank 20 has been replaced by dual clean water tanks 120A and 120B on either side of the engine compartment 112. Splitting of the clean water tanks 120A and 120B in this manner facilitates balancing of the pumping unit 110. The tanks 120A and 120B may be connected by a level balancing line 122.

Each pumping circuit and pump is operated in conventional manner, with modifications described here. Initially, clean water is passed through the pipes 54A and 54B and returned to the clean water tank 20 to ensure a free flow path. Pipes 54A and 54B are first each connected into respective pumping circuits 38A and 38B including pig launchers 70A, 70B. A single engine is used to drive both pumps 30A and 30B. Fluid flow in the pumping circuits 38A and 38B is controlled by respective variable flow control elements such as throttle valves 62A and 62B. The engine for the pumps 30A and 30B may be operated at constant speed, with flow control provided by the variable flow control element. A second engine with two pumping circuits and pumps may likewise be used to clean third and fourth pipes.

As disclosed in the inventor's own prior patents, albeit for a single pipe treatment at a time, the pipes may be cleaned by running pigs through specific sections repeatedly by reversing flow using the valve banks 48A, 48B etc operated by the operators at the consoles 90. Flow bypass and diversion may also be accomplished by control from the consoles 90 in conventional manner. Location of the pigs may be determined from the pressure recorders. As the pigs pass bends in the pipes being cleaned, the pressure spikes, which is observable to the operator. When to switch from flowing return fluid to the clean water tank or the dirty water tank may be determined by visual inspection by the operator looking out of the window of the operator's cabin at the flow of water from the return conduits. A single operator may manage two pipes being cleaned at a time, so that two operators in a single pumping unit may manage four pipes being cleaned at a time. A single pig handler may be used for all four pumping circuits, so that the total staff required to perform four passes at a time is three and only a single pumping unit is required.

Immaterial modifications may be made to the embodiments described here without departing from what is covered by the claims.

What is claimed is:

1. A four pass pig pumping unit, comprising:
    a trailer having an engine and pump compartment;
    one or more clean water tanks on the trailer;
    one or more dirty water tanks on the trailer;
    a first engine connected to drive a first pump and to drive a second pump, each of the first engine, the first pump and the second pump lying in the engine and pump compartment;
    the first pump having at least a first inlet and a first power outlet, the first inlet being connected to receive water from at least one of the one or more clean water tanks;

the second pump having at least a second inlet and a second power outlet, the second inlet being connected to receive water from at least one of the one or more clean water tanks;

a first valved pumping circuit connected to receive pig drive fluid from the first power outlet and including a first return conduit connected to return pig drive fluid to at least one of the one or more dirty water tanks, the first valved pumping circuit having connections for connecting a first pipe to be cleaned into the first valved pumping circuit;

a second valved pumping circuit connected to receive pig drive fluid from the second power outlet and including a second return conduit connected to return pig drive fluid to at least one of the one or more dirty water tanks, the second valved pumping circuit having connections for connecting a second pipe to be cleaned into the second valved pumping circuit;

a first variable flow control element on the first valved pumping circuit;

a second variable flow control element on the second valved pumping circuit;

a second engine connected to drive a third pump and to drive a fourth pump, the second engine, the third pump and the fourth pump lying in the engine and pump compartment;

the third pump having at least a third inlet and a third power outlet, the third inlet being connected to receive water from at least one of the one or more clean water tanks;

the fourth pump having at least a fourth inlet and a fourth power outlet, the fourth inlet being connected to receive water from at least one of the one or more clean water tanks;

a third valved pumping circuit connected to receive pig drive fluid from the third power outlet and including a third return conduit connected to return pig drive fluid to at least one of the one or more dirty water tanks, the third valved pumping circuit having connections for connecting a third pipe to be cleaned into the third valved pumping circuit;

a fourth valved pumping circuit connected to receive pig drive fluid from the fourth power outlet and including a fourth return conduit connected to return pig drive fluid to at least one of the one or more dirty water tanks, the fourth valved pumping circuit having connections for connecting a fourth pipe to be cleaned into the fourth valved pumping circuit;

a third variable flow control element on the third valved pumping circuit; and a fourth variable flow control element on the fourth valved pumping circuit, wherein first pump, second pump, third pump and fourth pump are located on one trailer.

2. The four pass pig pumping unit of claim 1 in which:
the one or more clean water tanks comprise at least a first clean water tank connected to the first inlet and a second clean water tank connected to the second inlet; and
the first clean water tank and the second clean water tank are located on opposite sides of the engine and pump compartment.

3. The four pass pig pumping unit of claim 1 in which:
the first variable flow control element is a first valve is located on the first return conduit; and the second variable flow control element is a second valve is located on the second return conduit.

4. The four pass pig pumping unit of claim 3 in which:
the one or more clean water tanks comprise at least a first clean water tank connected to the first inlet and a second clean water tank connected to the second inlet; and
the first clean water tank and the second clean water tank are located on opposite sides of the engine and pump compartment.

5. The four pass pig pumping unit of claim 1 in which:
the one or more clean water tanks comprise at least a first clean water tank connected to the first inlet and to the third inlet, and a second clean water tank connected to the second inlet and to the fourth inlet; and
the first clean water tank and the second clean water tank are located on opposite sides of the engine and pump compartment.

6. The four pass pig pumping unit of claim 1 in which:
the third variable flow control element is a third valve is located on the third return conduit; and
the fourth variable flow control element is a fourth valve is located on the fourth return conduit.

7. The four pass pig pumping unit of claim 1 in which the first pump is connected to be driven at a first end of the first engine, the second pump is connected to be driven at a second end of the first engine opposed to the first end of the first engine, the third pump is connected to be driven at a first end of the second engine, and the fourth pump is connected to be driven at a second end of the second engine opposed to the first end of the second engine.

8. The four pass pig pumping unit of claim 7 further comprising:
a first integral clutch of the first engine connected by a first drive shaft to the first pump;
the first engine being connected to drive the second pump through a standalone clutch;
a second integral clutch of the second engine connected by a second drive shaft to the third pump; and
the second engine being connected to drive the fourth pump through a standalone clutch.

9. The four pass pig pumping unit of claim 1 further comprising an operator's cabin on the trailer, the operator's cabin being provided with a plurality of consoles comprising a first console for the first valved pumping circuit, a second console for the second valved pumping circuit, a third console for the third valved pumping circuit and a fourth console for the fourth valved pumping circuit, the plurality of consoles being located together in pairs for operation by a first operator and a second operator, each operator operating a pair of consoles.

* * * * *